(12) United States Patent
Kotzur et al.

(10) Patent No.: US 11,106,607 B1
(45) Date of Patent: Aug. 31, 2021

(54) NUMA-AWARE STORAGE SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 16/836,341

(22) Filed: Mar. 31, 2020

(51) Int. Cl.
*G06F 13/40* (2006.01)
*G06F 13/16* (2006.01)

(52) U.S. Cl.
CPC ...... *G06F 13/1668* (2013.01); *G06F 13/4022* (2013.01); *G06F 13/4027* (2013.01)

(58) Field of Classification Search
CPC ............. G06F 13/4022; G06F 13/4027; G06F 13/1668
See application file for complete search history.

(56) References Cited

U.S. PATENT DOCUMENTS

| | | | | |
|---|---|---|---|---|
| 2010/0312943 A1* | 12/2010 | Uehara | ............... | G06F 13/387 710/316 |
| 2012/0096192 A1* | 4/2012 | Tanaka | ............... | G06F 13/385 710/20 |
| 2012/0254267 A1* | 10/2012 | Printezis | ............. | G06F 12/0269 707/818 |
| 2013/0311685 A1* | 11/2013 | Kudo | .................... | G06F 3/0659 710/40 |
| 2015/0026380 A1* | 1/2015 | Egi | ...................... | G06F 13/4282 710/308 |
| 2015/0261709 A1* | 9/2015 | Billi | ...................... | G06F 13/404 710/316 |
| 2016/0012003 A1* | 1/2016 | Chawla | ............... | G06F 13/4221 710/308 |
| 2016/0140074 A1* | 5/2016 | Lee | ...................... | G06F 13/4022 710/313 |
| 2017/0103018 A1* | 4/2017 | Yadav | ................. | G06F 12/0893 |

(Continued)

*Primary Examiner* — Raymond N Phan
(74) *Attorney, Agent, or Firm* — Haynes and Boone, LLP

(57) ABSTRACT

A NUMA-aware storage system including a first processing subsystem coupled to a first memory subsystem, and a second processing subsystem coupled to a second memory subsystem. A first NTB subsystem connected to the first processing subsystem presents itself as a first storage device, identifies first data transfer operations directed to the first memory subsystem and, in response, claims those first data transfer operations and provides them directly to the first processing subsystem. A second NTB subsystem connected to the second processing subsystem presents itself as a second storage device, identifies second data transfer operations directed to the second memory subsystem and, in response, claims those second data transfer operations and provides them directly to the second processing subsystem. A storage controller system receives a command from either the first or second processing subsystem via the first or second NTB subsystem and, in response, transmits that command to a storage system.

20 Claims, 17 Drawing Sheets

(56) References Cited

U.S. PATENT DOCUMENTS

| | | | |
|---|---|---|---|
| 2017/0147456 A1* | 5/2017 | Lee | G06F 13/404 |
| 2017/0286283 A1* | 10/2017 | Xu | G06F 3/0604 |
| 2018/0024743 A1* | 1/2018 | Herman | G06F 13/4022 |
| | | | 710/316 |
| 2018/0203734 A1* | 7/2018 | Lowery | G06F 9/3889 |
| 2018/0314666 A1* | 11/2018 | Tanaka | G06F 13/404 |
| 2018/0341619 A1* | 11/2018 | Slik | G06F 3/067 |
| 2020/0226078 A1* | 7/2020 | Tanaka | G06F 13/28 |
| 2020/0348869 A1* | 11/2020 | Gokam | G06F 13/1642 |

* cited by examiner

NUMA-AWARE STORAGE SYSTEM

BACKGROUND

The present disclosure relates generally to information handling systems, and more particularly to storing data in a Non-Uniform Memory Access (NUMA)-enabled information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, may be configured to include multiple processors and utilize a Non-Uniform Memory Access (NUMA) computer memory design in which each processor is provided a local memory that it can access quickly, with those processors coupled together via processor interconnects (e.g., Ultra-Path Interconnects (UPIs) available in processing systems provided by INTEL® Corporation of Santa Clara, Calif., United States) that allow the processors to access memory that is local to the other processors. Furthermore, such server devices may be provided with a plurality of endpoints (e.g., PCIe endpoints) such as, for example, storage device endpoints that provide a Redundant Array of Independent Disks (RAID) data storage system. As will be appreciated by one of skill in the art, RAID data storage systems are provided by a data storage virtualization technology that combines the physical RAID data storage devices into one or more logical storage units for the purposes of data redundancy, performance improvements, and/or other benefits known in the art. For example, data in a RAID data storage system may be distributed across the RAID data storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity.

The introduction of new storage technologies for use in RAID data storage systems has provided for performance and efficiency improvements in RAID data storage systems. For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art, and have begun to be implemented as the RAID data storage devices discussed above in order to assist in data update operations for the RAID data storage system. The inventors of the present disclosure describe some techniques for performing RAID storage-device-assisted data updates in U.S. patent application Ser. No. 16/586,446, filed on Sep. 27, 2019, and those RAID data storage systems may utilize NVMe storage devices to perform some or all of the data update operations that are traditionally performed by a RAID storage controller device in the RAID data storage system.

However, the processors utilizing the NUMA computer memory design discussed above may be coupled to the storage device endpoints discussed above via hardware with fixed/static communication couplings in order to allow those processors to communicate with the storage device endpoints to store data on, and retrieve data from, those storage device endpoints. The use of fixed/static communication couplings between the processors and storage device endpoints prevents the scaling of storage device endpoints (e.g., to provide additional storage device endpoints in the server device), and can result in the use of the processor interconnects in storage device endpoints communications, which reduces throughput via the processor interconnects (which are meant to allow processors to access neighboring processor root complexes) and increases latency in those communications.

Accordingly, it would be desirable to provide a NUMA-connected storage system that addresses the issues discussed above.

SUMMARY

According to one embodiment, an Information Handling System (IHS) includes a first Non-Transparent Bridge (NTB) subsystem that is connected to a first processing subsystem and that is configured to: present the first NTB subsystem to the first processing subsystem as a first storage device; and identify first data transfer operations directed to a first memory subsystem that is connected to the first processing subsystem and, in response, claim those first data transfer operations and provide them directly to the first processing subsystem; a second NTB subsystem that is connected to a second processing subsystem and that is configured to: present the second NTB subsystem to the second processing subsystem as a second storage device; and identify second data transfer operations directed to a second memory subsystem that is connected to the second processing subsystem and, in response, claim those second data transfer operations and provide them directly to the second processing subsystem; a controller processing system that is coupled to the first NTB subsystem and the second NTB subsystem; and a controller memory system that is coupled to the controller processing system and that includes instructions that, when executed by the controller processing system, cause the controller processing system to provide a storage controller engine that is configured to: receive a command from either the first processing subsystem via the first NTB subsystem or the second processing subsystem via the second NTB subsystem and, in response, transmit that command to a storage system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
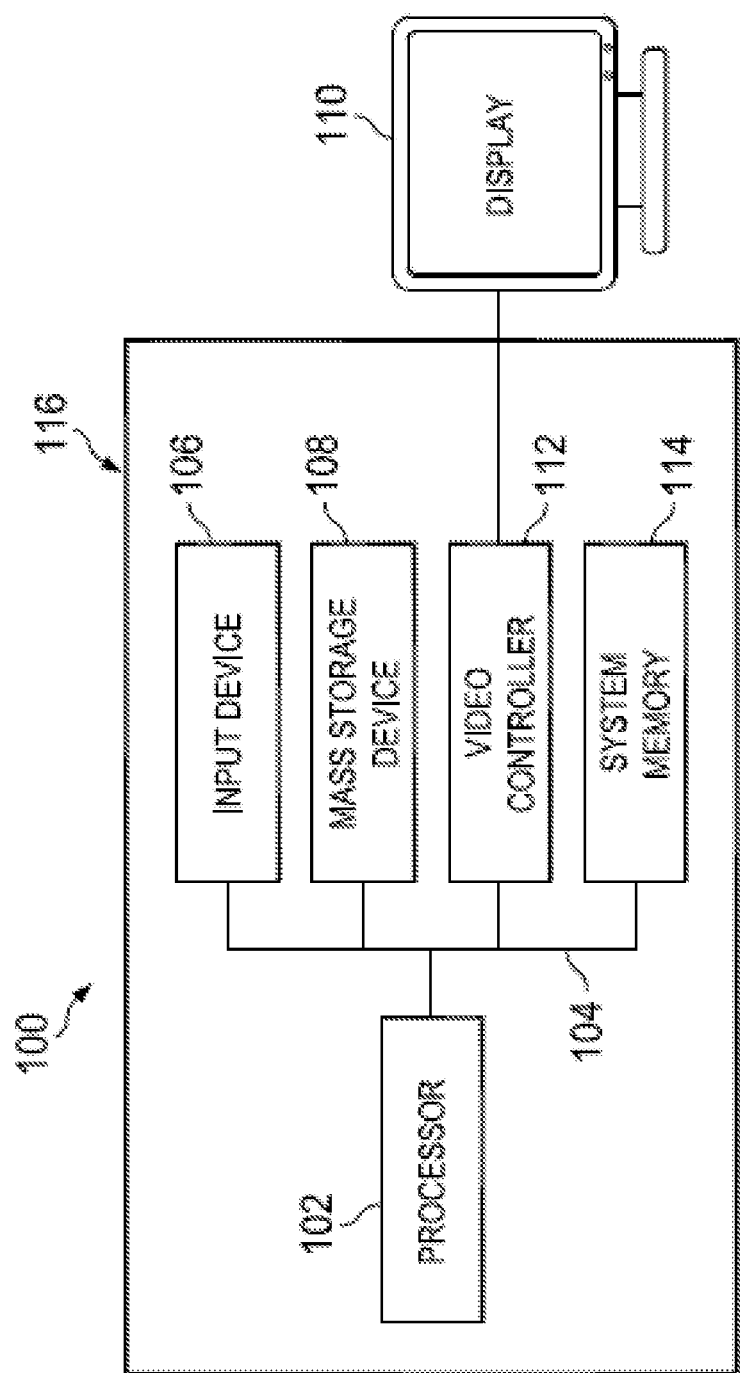
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
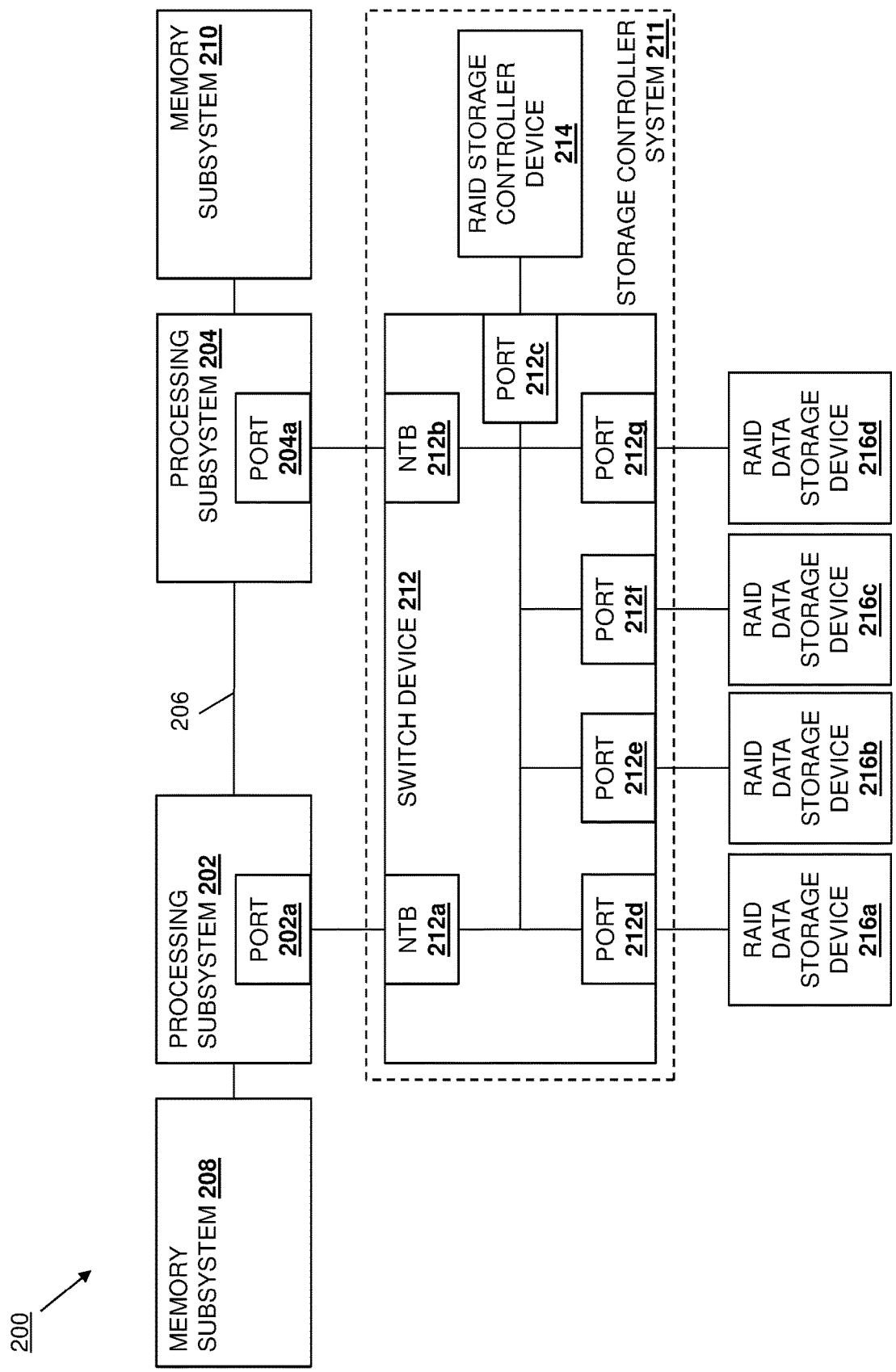
FIG. 2 is a schematic view illustrating an embodiment of a NUMA-aware storage system.

Referring now to FIG. 2, an embodiment of a Non-Uniform Memory Access (NUMA)-aware storage system 200 is illustrated. As will be appreciated by one of skill in the art in possession of the present disclosure, the NUMA-aware storage system 200 may be provided entirely in a chassis (e.g., the chassis 116 discussed above with reference to FIG. 1) of a computing device (e.g., a server device), distributed across multiple chassis, and/or in any other manner that would be apparent to one of skill in the art in possession of the present disclosure. For example, portions of the NUMA-aware storage system 200 may be provided in a server chassis (e.g., the NUMA nodes provided by the processing subsystems discussed below, their corresponding memory subsystems, etc.), while portions of the NUMA-aware storage system 200 may be provided outside of that server chassis (e.g., the storage controller system discussed below, the storage system discussed below, etc.) As such, the example of the NUMA-aware storage system 200 discussed herein may be provided in a variety of configurations and manners while remaining within the scope of the present disclosure as well.

In the illustrated embodiment, the NUMA-aware storage system 200 includes a plurality of processing subsystems 202 and 204 that may be provided on a board (not illustrated, but which may be provided by a motherboard and/or other circuit boards known in the art) and coupled together via a processing subsystem interconnect 206 such as, for example, Ultra-Path Interconnects (UPI) available on processing systems provided by INTEL® corporation of Santa Clara, Calif., United States, which may be provided via trace(s) on the board discussed above. In the illustrated embodiment, a memory subsystem 208 is connected to the processing subsystem 202 (e.g., via trace(s) on the board discussed above), and a memory subsystem 210 is connected to the processing subsystem 204 (e.g., via trace(s) on the board discussed above.)

For the purposes of some of the examples provided below, the embodiment of the NUMA-aware storage system 200 illustrated in FIG. 2 provides an example of a two-processor system having the processing subsystems 202 and 204 coupled together via a UPI 206, and connected to respective memory subsystems 208 and 210. For example, the processing subsystems and memory subsystems in the server device 200 may utilize a Non-Uniform Memory Access (NUMA) computer memory design in which each respective processing subsystem is connected to a respective local memory subsystem to provide a respective NUMA node (i.e., the processing subsystem 202 and its "local" memory subsystem 208 provide a first NUMA node, and the processing subsystem 204 and its "local" memory subsystem 210 provide a second NUMA node.) However, while two processing subsystems/memory subsystems (e.g., two NUMA nodes) are illustrated in FIG. 2, one of skill in the art in possession of the present disclosure will appreciate that more processing subsystems/memory subsystems (e.g., NUMA nodes) may be provided according to the teachings of the present disclosure while falling within its scope as well.

As discussed below, a storage controller system 211 may be coupled to the processing subsystems 202 and 204. For example, the storage controller system 211 of the present disclosure may include a card (e.g., Redundant Array of Independent Disks (RAID) card) that is provided in the server device and coupled to the processing subsystems 202 and 204. In the illustrated embodiment, the storage controller system 211 includes a switch device 212 that is coupled to the processing subsystems 202 and 204, and a Redundant Array of Independent Disks (RAID) storage controller device 214 that is coupled to the switch device 212. For example, the switch device 212 may be provided by a Peripheral Component Interconnect Express (PCIe) switch device, and may include a port (not illustrated, but which may include an Upstream Port (USP) in the example provided below, or other ports known in the art) that is directly connected to a port 202a (e.g., a root port such as a PCIe root port, or other ports known in the art) on the processing subsystem 202, and that has been configured as a Non-Transparent Bridge (NTB) subsystem 212a, as well as a port (not illustrated, but which may include a USP in the example provided below, or other ports known in the art) that is directly connected to a port 204a (e.g., a root port such as a PCIe root port, or other ports known in the art) on the processing subsystem 204, and that has been configured as an NTB subsystem 212b.

For example, one of skill in the art in possession of the present disclosure will recognize that the USPs in the switch device 212 may be configured as NTB subsystems 212a and 212b by including a PCIe NTB chip that connects the memory subsystems 208 and 210 to the same PCIe fabric, and that includes NTB hardware that supports doorbell registers, memory translation windows, scratchpad registers, memory registers, and/or other NTB feature sets known in the art. Furthermore, as discussed below, each of the NTB subsystems 212a and 212b may be configured to present themselves to their connected processing subsystems 202 and 204 (e.g., first and second NUMA nodes), respectively, as a single RAID data storage device (e.g., a single NVMe storage device). However, while discussed as being configured as NTB subsystems, one of skill in the art in possession of the present disclosure will recognize that the ports directly connected to the processing subsystems/NUMA nodes may be configured in other manners (e.g., via a RAID-on-Chip (ROC) that provides an "inline" RAID storage controller device) to provide the functionality of the NTB subsystems 212a and 212b discussed below. Furthermore, the switch device 212 may include a port 212c (e.g., a USP in the example provided below, or other ports known in the art) that is directly connected to the RAID storage controller device 214. However, while a specific switch device 212 is described above, one of skill in the art in possession of the present disclosure will appreciate that other switch devices will fall within the scope of the present disclosure as well.

In an embodiment, the RAID storage controller device 214 may include a RAID storage controller processing system (not illustrated, but which may include the processor 102 discussed above with reference to FIG. 1) and a RAID storage controller memory system (not illustrated, but which may include the memory 114 discussed above with reference to FIG. 1) that is coupled to the RAID storage controller processing system and that includes instructions that, when executed by the RAID storage controller processing system, cause the RAID storage controller processing system to provide a RAID storage controller engine that is configured to perform RAID Input/Output (I/O) processing functionality, as well as any of the other functionality of the RAID storage controller devices, RAID storage controller engines, and/or RAID storage controller systems discussed below. However, while a specific RAID storage controller system is illustrated and described in the examples below, storage controller systems may be provided in the NUMA-aware storage system 200 in a variety of configurations and manners that will fall within the scope of the present disclosure as well. For example, the switch device 212 and the RAID storage controller device 214 that provide the storage controller system 211 may be replaced by a System-On-a-Chip (SoC) such as, for example, a RAID SoC. As such, a wide variety of modification to the storage controller systems described below is envisioned as falling within the scope of the present disclosure as well.

In the illustrated embodiment, the NUMA-aware storage system 200 includes a RAID storage system that, in the examples provided below, include a plurality of RAID data storage devices 216a, 216b, 216c, and 216d. For example, the switch device 212 may include a port 212d (e.g., a Downstream Port (DSP) in the example provided below, or other ports known in the art) that is directly connected to the RAID data storage device 216a, a port 212e (e.g., a DSP in the example provided below, or other ports known in the art) that is directly connected to the RAID data storage device 216b, a port 212f (e.g., a DSP in the example provided below, or other ports known in the art) that is directly connected to the RAID data storage device 216c, and a port 212g (e.g., a DSP in the example provided below, or other ports known in the art) that is directly connected to the RAID data storage device 216d. As will be appreciated by one of skill in the art in possession of the present disclosure, the ports 212d-212g may each provide a respective full bandwidth connection for its corresponding RAID data storage devices 216a-216d (e.g., PCIe x4 link connections), which provides bandwidth advantages over systems that utilize dual ports on the RAID data storage devices to connect to each of the processing subsystems 202 and 204/NUMA nodes, while the switch device 212 operates to eliminate the need for dedicated processing subsystem/NUMA node communication capabilities in the RAID data storage devices.

While a few RAID data storage devices in a particular configuration are illustrated, one of skill in the art in possession of the present disclosure will recognize that many more storage devices may (and typically will) be included in the NUMA-aware storage system 200 (e.g., in a datacenter) and may be provided in other RAID configurations while remaining within the scope of the present disclosure. In the embodiments discussed below, the RAID data storage devices 216a-216d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well.

Furthermore, one of skill in the art in possession of the present disclosure will appreciate that while the storage controller system and storage system in the example below focuses on a RAID storage controller system and RAID storage system, other types of storage systems may benefit from the teachings of the present disclosure as thus may fall within its scope as well. Further still, while a specific NUMA-aware storage system 200 has been illustrated and described, one of skill in the art in possession of the present disclosure will recognize that the NUMA-aware storage system of the present disclosure may include a variety of components and component configurations while remaining within the scope of the present disclosure as well. For example, while the teachings of the present disclosure describe a storage system that is NUMA-aware, one of skill in the art in possession of the present disclosure will appreciate that other PCIe devices may replaces the NVMe RAID data storage devices described herein in order to provide a NUMA-aware PCIe device system that operates according to the teachings of the present disclosure.

Figure 3:
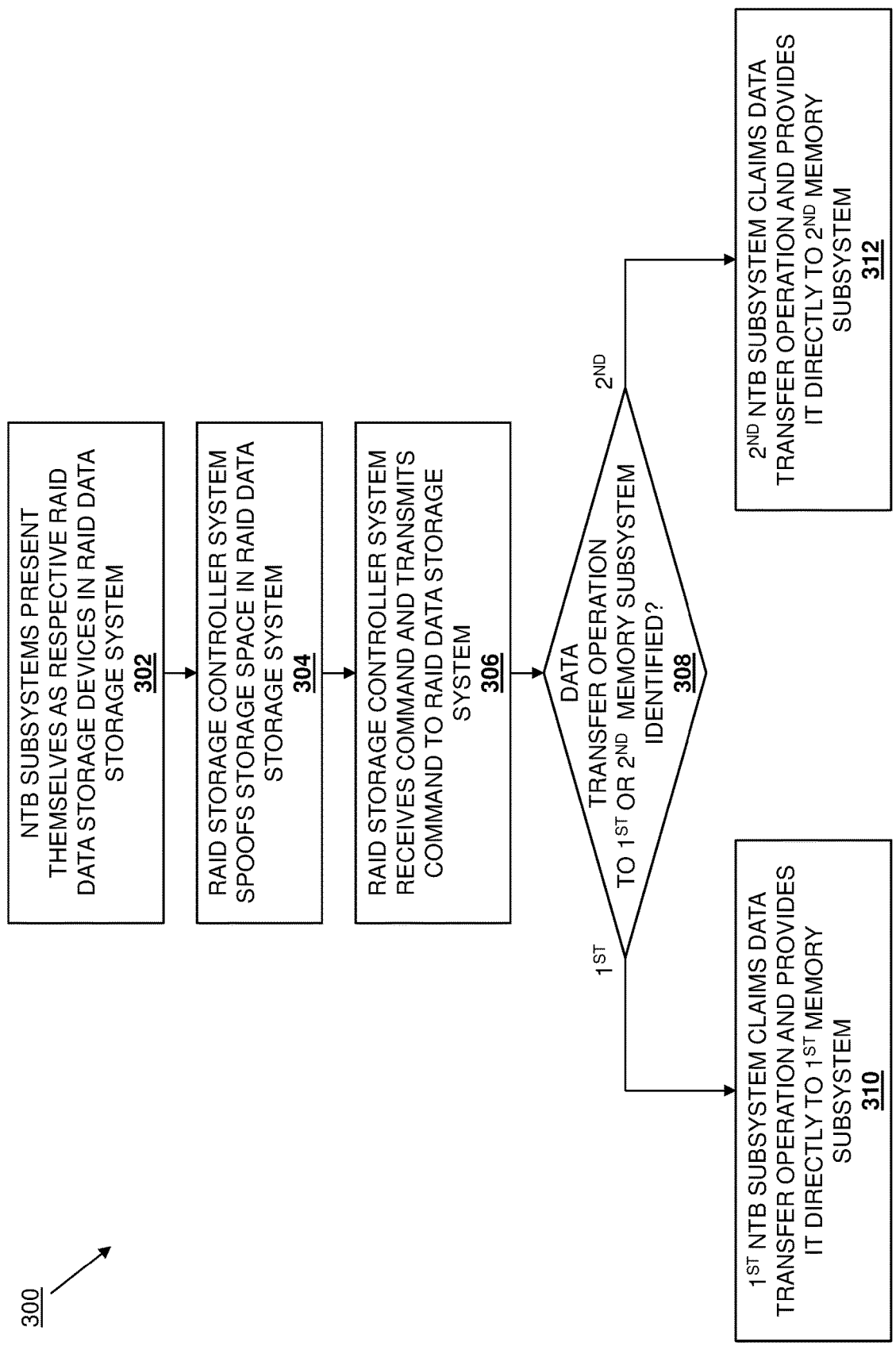
FIG. 3 is a flow chart illustrating an embodiment of a method for storing data in a NUMA-enabled computing device.

Referring now to FIG. 3, an embodiment of a method 300 for storing data in a NUMA-enabled computing device is illustrated. As discussed below, the systems and methods of the present disclosure provide a storage controller system that includes a respective upstream port directly connected to each NUMA node, with each upstream port configured with a respective NTB subsystem that presents itself to its directly connected NUMA node as a single storage device in a storage system. The storage controller system may then operate to spoof a storage space provided by the storage system. When either of the NUMA nodes generates and transmits a data transfer command to the RAID storage controller system, the RAID storage controller system will receive that command and transmit it to the appropriate storage device in the storage system, and that storage device may perform a data transfer operation that identifies data stored in a memory subsystem included in one of the NUMA nodes. Each of the NTB subsystems are configured to identify when a data transfer operation identifies data stored in a memory subsystem included in its directly connected NUMA node, and thus the one of the NTB subsystems will claim the data transfer operation performed by the storage device, and provide that data transfer operation directly to its directly connected NUMA node. As such, data transfer operations between the NUMA nodes and the storage devices in the storage system will not be transmitted over a processing subsystem interconnect (that is provided between the processing subsystems in the NUMA nodes), thus allowing scaling of the computing device that includes the NUMA nodes (e.g., to provide additional processing subsystems), reducing the use of the processor interconnects to increase processing subsystem interconnect throughput and decrease latency associated with processing subsystem interconnect communications, and/or providing other benefits that would be apparent to one of skill in the art in possession of the present disclosure.

In an embodiment, during or prior to the method 300, the RAID storage controller engine in the RAID storage controller device 214 may operate to program the NTB subsystems 212a and 212b with logic that sets up NTB subsystem memory claim ranges in order to configure the NTB subsystem 212a to claim memory addresses in the memory subsystem 208 directly connected to the processing subsystem 202, as well as to configure the NTB subsystem 212b to claim memory addresses in the memory subsystem 210 directly connected to the processing subsystem 204. As discussed below, such programming of the NTB subsystems 212a and 212b provides for the routing of data transfers and/or other communications between the processing subsystem/memory subsystems pairs (e.g., NUMA nodes) and the RAID data storage devices 216a-216d such that those data transfers and/or other communications do not utilize the processing subsystem interconnect 206.

For example, as discussed below, the RAID data storage devices 216a-216d (e.g., NVMe storage devices) may perform Direct Memory Access (DMA) operations that target a particular memory subsystem 208 or 210 by specifying memory address(es) in that memory subsystem, and the switch device 212 may be configured to route those DMA operations to the NTB subsystem directly connected to the processing subsystem connected to that memory subsystem by programming the NTB subsystems 212a and 212b to claim memory addresses (identified in DMA operations) that are included in the memory subsystem connected to their directly connected processing subsystem. Some of the inventors of the present disclosure describe techniques for sending system memory maps to dual port NVMe devices in U.S. patent application Ser. No. 16/361,775, filed on Mar. 22, 2019, the disclosure of which is incorporated herein by reference in its entirety, and one of skill in the art in possession of the present disclosure will recognize how the teaching in that application may be utilized to configure the switch device 212 as discussed above. In a specific example, the memory subsystem 208 may include 4 GB of memory designated as a "0-4 GB" memory address range, and the memory subsystem 210 may include 4 GB of memory designated as a "4-8 GB" memory address range. As such, the NTB subsystem 212a may be programmed to claim memory addresses included in the "0-4 GB" memory address range and route DMA operations directed to those memory addresses directly to the processing subsystem 202, while the NTB subsystem 212b may be programmed to claim memory addresses included in the "4-8 GB" memory address range and transmit DMA operations directed to those memory addresses directly to the processing subsystem 204.

While the programming of the NTB subsystems 212a and 212b is discussed as being performed by the RAID storage controller device 214, one of skill in the art in possession of the present disclosure will appreciate that the programming of the NTB subsystems 212a and 212b may be performed by a management processing subsystem included in the switch device 212, and/or other management subsystems in the NUMA-aware storage system 200 while remaining within the scope of the present disclosure as well. Furthermore, while the programming of the NTB subsystems 212a and 212b is discussed above as being provided by a "static mapping" that is set up prior to operation of the NUMA-aware storage system 200, one of skill in the art in possession of the present disclosure will recognize that the RAID storage controller device 214 may be configured to program the NTB subsystems 212a and 212b as data transfers and/or other communications are received by the RAID storage controller device 214 (e.g., by setting up a translation window for each I/O command received by the RAID storage controller device 214.) As such, a wide variety of modification of the NTB subsystem programming discussed above is envisioned as falling within the scope of the present disclosure.

The method 300 begins at block 302 where NTB subsystems present themselves as respective RAID data storage devices in a RAID data storage system. As discussed above and as will be appreciated by one of skill in the art in possession of the present disclosure, each of the NTB subsystems 212a and 212b in the switch device 212 may "block" the view of the components behind them (e.g., from the perspective of the processing subsystems 202 and 204/NUMA nodes) and present themselves as a respective, single RAID data storage device (e.g., a single NVMe storage device). As such, at block 302, the NTB subsystem 212a may present itself to the processing subsystem 202/first NUMA node as a single RAID data storage device/NVMe storage device such that the processing subsystem 202/first NUMA node "believes" it is connected directly to a single RAID data storage device/NVMe storage device, and the NTB subsystem 212b may present itself to the processing subsystem 204/second NUMA node as a single RAID data storage device/NVMe storage device such that the processing subsystem 204/second NUMA node "believes" it is connected directly to a single RAID data storage device/NVMe storage device. As will be understood by one of skill in the art in possession of the present disclosure and as discussed below, the NTB subsystems 212a and 212b configured in such a manner will operate to forward communications received from their directly connected processing subsystem/NUMA node to the RAID storage controller device 214.

The method 300 then proceeds to block 304 where a RAID storage controller system spoofs storage space in the RAID data storage system. In an embodiment, at block 304, the RAID storage controller engine in the RAID storage controller device 214 may operate to spoof a storage space provided by the RAID data storage system that includes the RAID data storage devices 216a-216d. As would be understood by one of skill in the art in possession of the present disclosure, the RAID data storage devices 216a-216d (e.g., NVMe storage devices) provide a storage space for the RAID data storage system that is referred to as a "namespace" in NVMe systems, a "Logical Unit Number (LUN)" in Small Computer System Interface (SCSI) systems, and a "virtual drive" in RAID systems.

Thus, in an example in which the RAID data storage devices are NVMe storage devices, at block 304 the RAID storage controller engine in the RAID storage controller device 214 may operate to spoof an NVMe namespace that provides the RAID virtual drive in the RAID storage system, which one of skill in the art in possession of the present disclosure will recognize may be presented to the processing subsystems 202 and 204/(e.g., NUMA nodes) such that those processing subsystems 202 and 204/NUMA nodes "believe" they are communicating with a single NVMe storage device/namespace/RAID virtual drive. For example, NVMe controllers in the NVMe RAID data storage devices 206a-206d may be spoofed by a combination of the NTB subsystems 212a and/or 212b and the RAID storage controller device 214, with the RAID storage controller device 214 also spoofing an NVMe namespace. As will be appreciated by one of skill in the art in possession of the present disclosure, the NVMe namespace spoofed by the RAID storage controller device 214 may represent a single NVMe RAID data storage device, may represent a virtual RAID volume provided by the NVMe RAID data storage device(s) 206a, 206b, 206c, and/or 206d, and/or may represent any other storage space that would be apparent to one of skill in the art in possession of the present disclosure.

As such, the NVMe namespace may be presented to the processing subsystems 202 and 204 as a single namespace, while on the "backend" the RAID storage device controller 214 may mirror data across two different RAID data storage devices 206a-206d, may perform RAID 5 operations across the RAID data storage devices 206a-206d, and/or may perform any other storage operations that would be apparent to one of skill in the art in possession of the present disclosure. As such, the NVMe namespace may be "shared" on each NTB subsystem 212a and 212b such that the processing subsystems 202 and/or 204 will see the same NVMe namespace on either of the NTB subsystems 212 and 212b. As will be appreciated by one of skill in the art in possession of the present disclosure, the processing subsystems 202 and 204 may require a multi-path driver in order to recognize that there are two different paths to the same namespace such that they may issue I/O commands on either path. However, while a specific example of NVMe storage devices providing a RAID storage system are provided, one of skill in the art in possession of the present disclosure will recognize that the RAID storage controller device may spoof a storage space for any storage system utilizing any types of storage devices while remaining within the scope of the present disclosure as well.

Figure 4A:
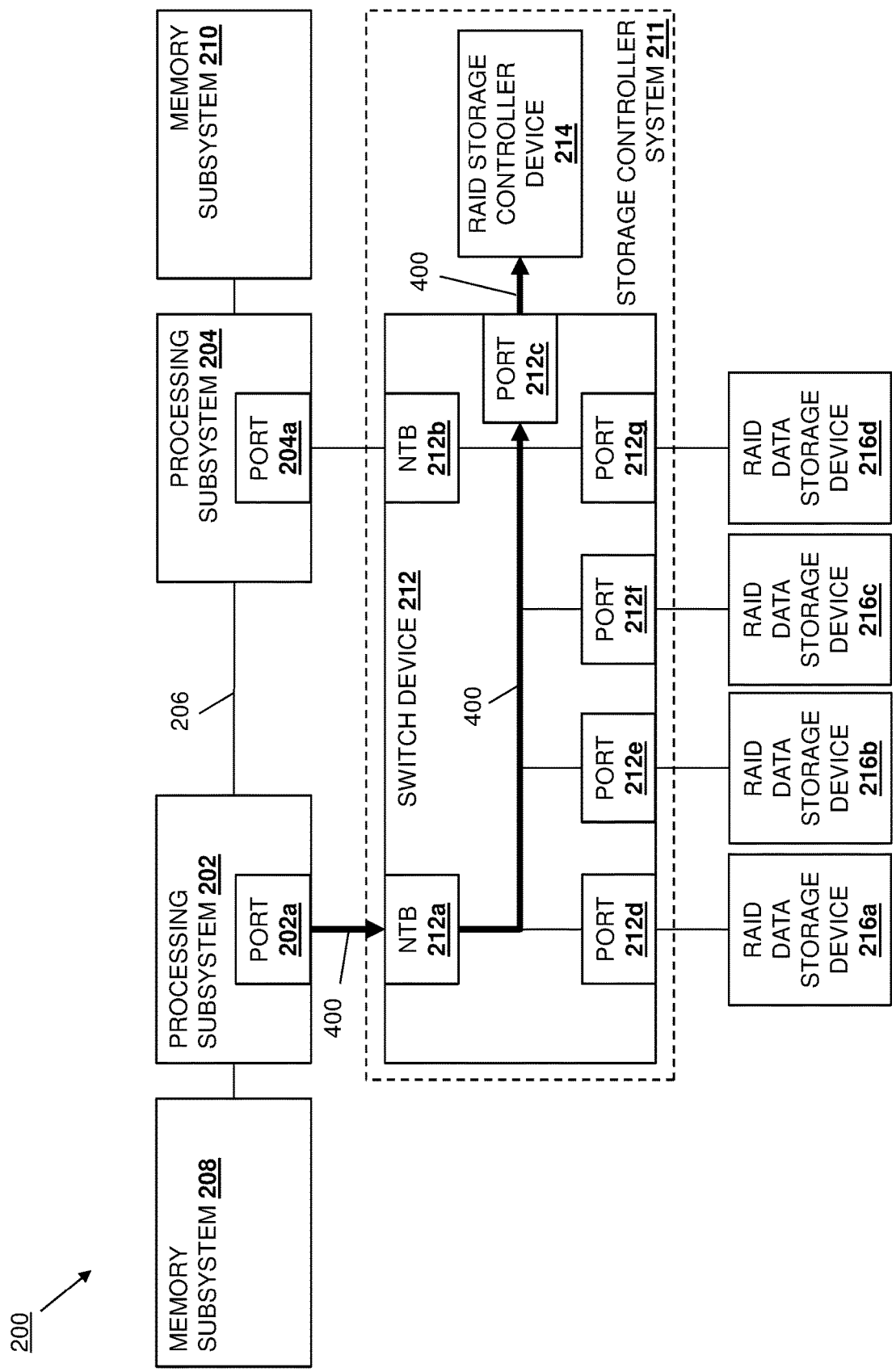
FIG. 4A is a schematic view illustrating an embodiment of the NUMA-aware storage system of FIG. 2 operating during the method of FIG. 3.
Figure 4B:
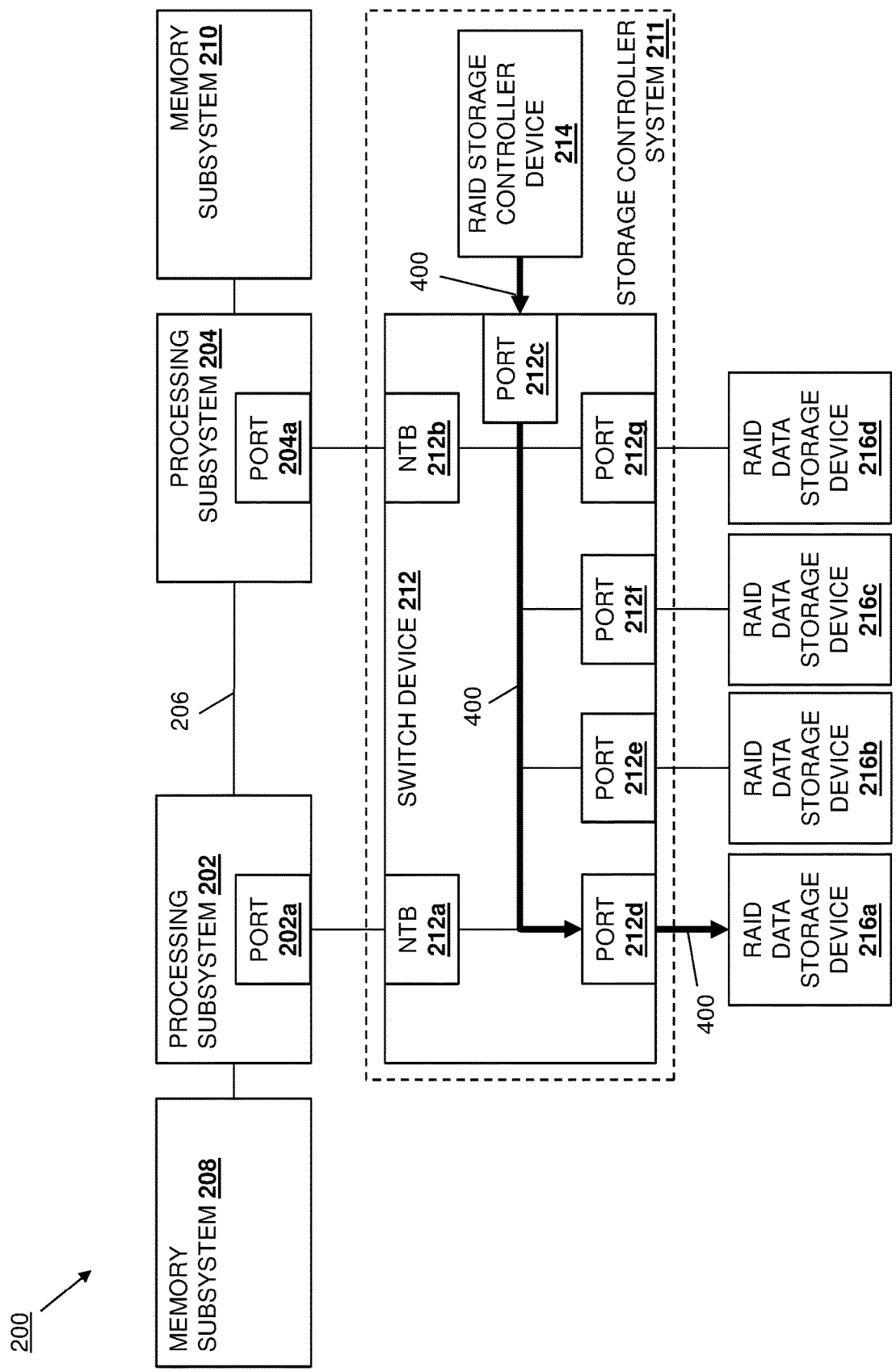
FIG. 4B is a schematic view illustrating an embodiment of the NUMA-aware storage system of FIG. 2 operating during the method of FIG. 3.

The method 300 then proceeds to block 306 where a RAID storage controller system receives a command and transmits the command to the RAID data storage system. With reference to FIG. 4A, in an embodiment of block 306, the processing subsystem 202 may generate a write command 400 that instructs the writing of data in the memory subsystem 208 to the RAID data storage subsystem, and transmit that write command 400 via its port 202a to the NTB subsystem 212a in the switch device 212. As discussed above, the NTB subsystem 212a presents itself to the processing subsystem 202 as a single RAID data storage device (e.g., a single NVMe storage device) and, upon receiving the write command 400, may operate to forward that write command 400 received from processing subsystem 202 via the port 212c to the RAID storage controller device 214. In an embodiment, the RAID storage controller engine in the RAID storage controller device 214 may receive the write command 400 and, in response, determine that the write command 400 should be forwarded to the RAID data storage device 216a. As such, as illustrated in FIG. 4B, the RAID storage controller engine in the RAID storage controller device 214 may forward the write command 400 to the switch device 212, and in response to receiving the write command 400 via its port 212c, the switch device 212 may forward the write command 400 via its port 212d to the RAID data storage device 216a.

Figure 5A:
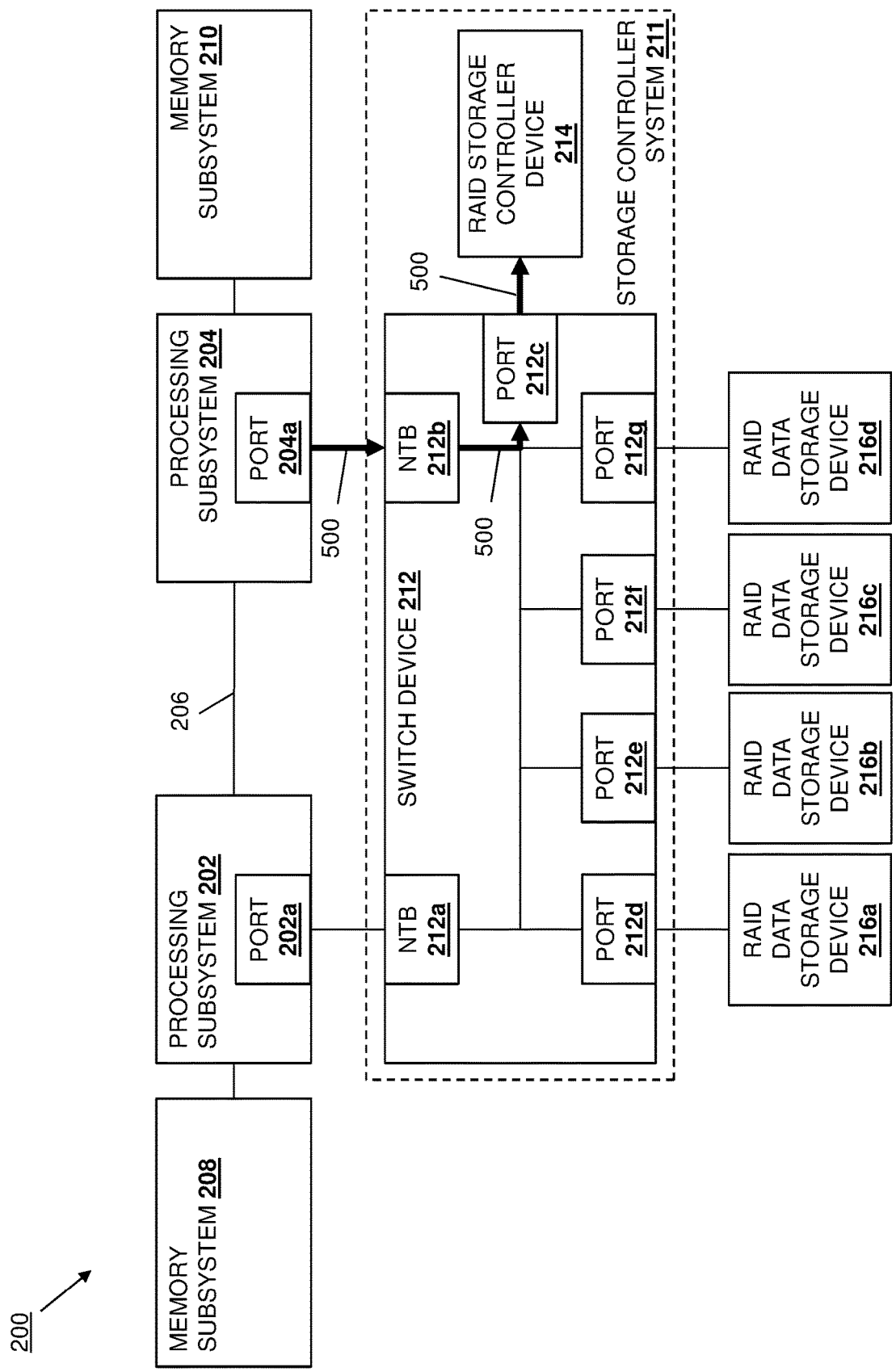
FIG. 5A is a schematic view illustrating an embodiment of the NUMA-aware storage system of FIG. 2 operating during the method of FIG. 3.
Figure 5B:
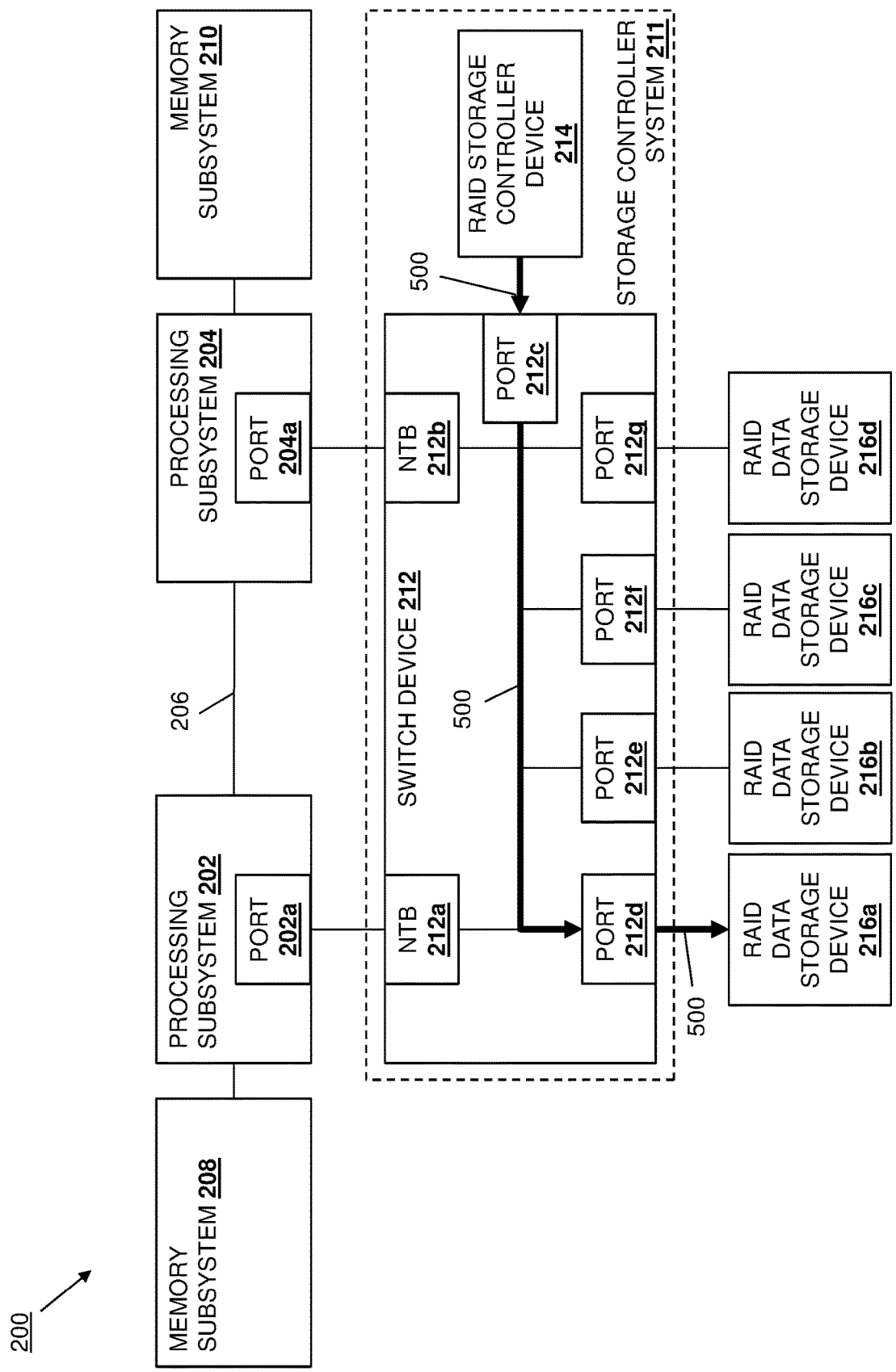
FIG. 5B is a schematic view illustrating an embodiment of the NUMA-aware storage system of FIG. 2 operating during the method of FIG. 3.

Similarly, with reference to FIG. 5A, in an embodiment of block 306 the processing subsystem 204 may generate a write command 500 that instructs the writing of data in the memory subsystem 210 to the RAID data storage subsystem, and transmit that write command 500 via its port 204*a* to the NTB subsystem 212*b* in the switch device 212. As discussed above, the NTB 212*b* presents itself to the processing subsystem 204 as a single RAID data storage device (e.g., a single NVMe storage device) and, upon receiving the write command 500, may operate to forward that write command 500 received from processing subsystem 204 via the port 212*c* to the RAID storage controller device 214. In an embodiment, the RAID storage controller engine in the RAID storage controller device 214 may receive the write command 500 and, in response, determine that the write command 500 should be forwarded to the RAID data storage device 216*a*. As such, as illustrated in FIG. 5B, the RAID storage controller engine in the RAID storage controller device 214 may forward the write command 500 to the switch device 212, and in response to receiving the write command 500 via its port 212*c*, the switch device 212 may forward the write command 500 via its port 212*d* to the RAID data storage device 216*a*. However, while write commands are discussed being provided to the RAID data storage device 216*a* above, one of skill in the art in possession of the present disclosure that other types of commands may be provided to other RAID data storage devices in the NUMA-aware storage system 200 while remaining within the scope of the present disclosure as well.

For example, the RAID storage controller device 214 may perform data mirroring operations in the RAID data storage system 200 by sending multiple commands to different ones of the RAID data storage devices 216*a*-216*d*. As would be appreciated by one of skill in the art in possession of the present disclosure, the data mirroring operations discussed above may include the processing subsystem 202 issuing a write command to the NTB subsystem 212*a* (which presents itself as an NVMe RAID data storage device), and the NTB subsystem 212*a* may provide that write command to the RAID storage controller device 214. The RAID storage controller device 214 may then issue that same write command to two of the RAID data storage devices 216*a*-216*d* in order to mirror the data being written, while sending back a single completion communication to the processing subsystem 202. One of skill in the art in possession of the present disclosure will appreciate that a variety of other RAID operations may be performed according to the teachings of the present disclosure in a similar manner. For example, the inventors of the present disclosure describe some techniques for drive-assisted RAID operations in a RAID data storage system in U.S. patent application Ser. No. 16/813,145, filed on Mar. 9, 2020, the disclosure of which is incorporated herein by reference in its entirety, and those RAID operations may be performed according to the teaching of the present disclosure as well.

The method 300 then proceeds to decision block 308 where the method 300 proceeds based on whether a data transfer operation to a particular memory subsystem has been identified. As discussed below, in one embodiment of decision block 308, a data transfer operation may be directed to the memory subsystem 208 and, as such, the method 300 may proceed to block 310 as discussed with reference to FIGS. 4C, 4D, and 4E below. As also discussed below, in another embodiment of decision block 308, a data transfer operation may be directed to the memory subsystem 210 and, as such, the method 300 may proceed to block 312 as discussed with reference to FIGS. 5C, 5D, and 5E below.

Figure 4C:
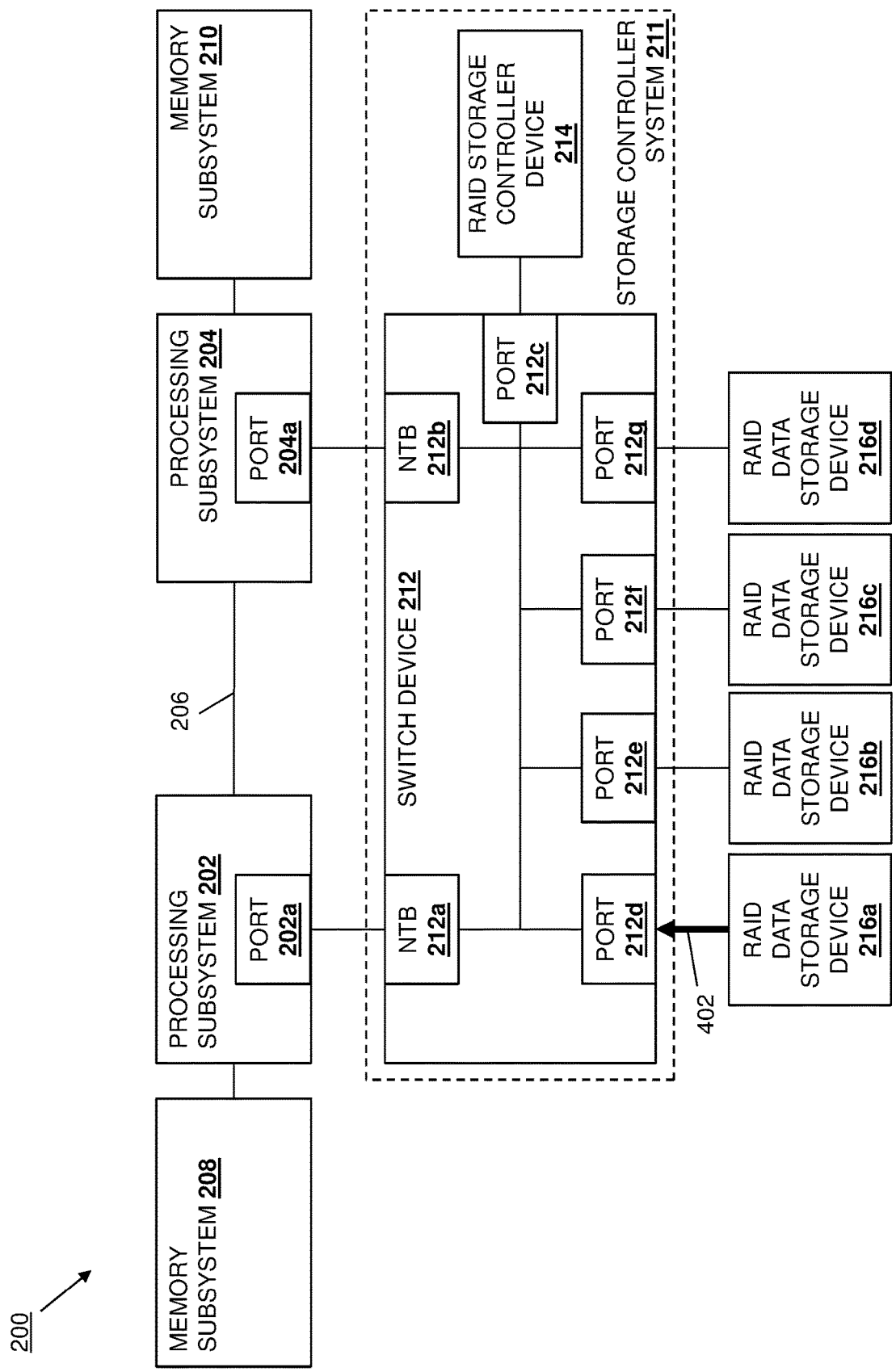
FIG. 4C is a schematic view illustrating an embodiment of the NUMA-aware storage system of FIG. 2 operating during the method of FIG. 3.
Figure 4D:
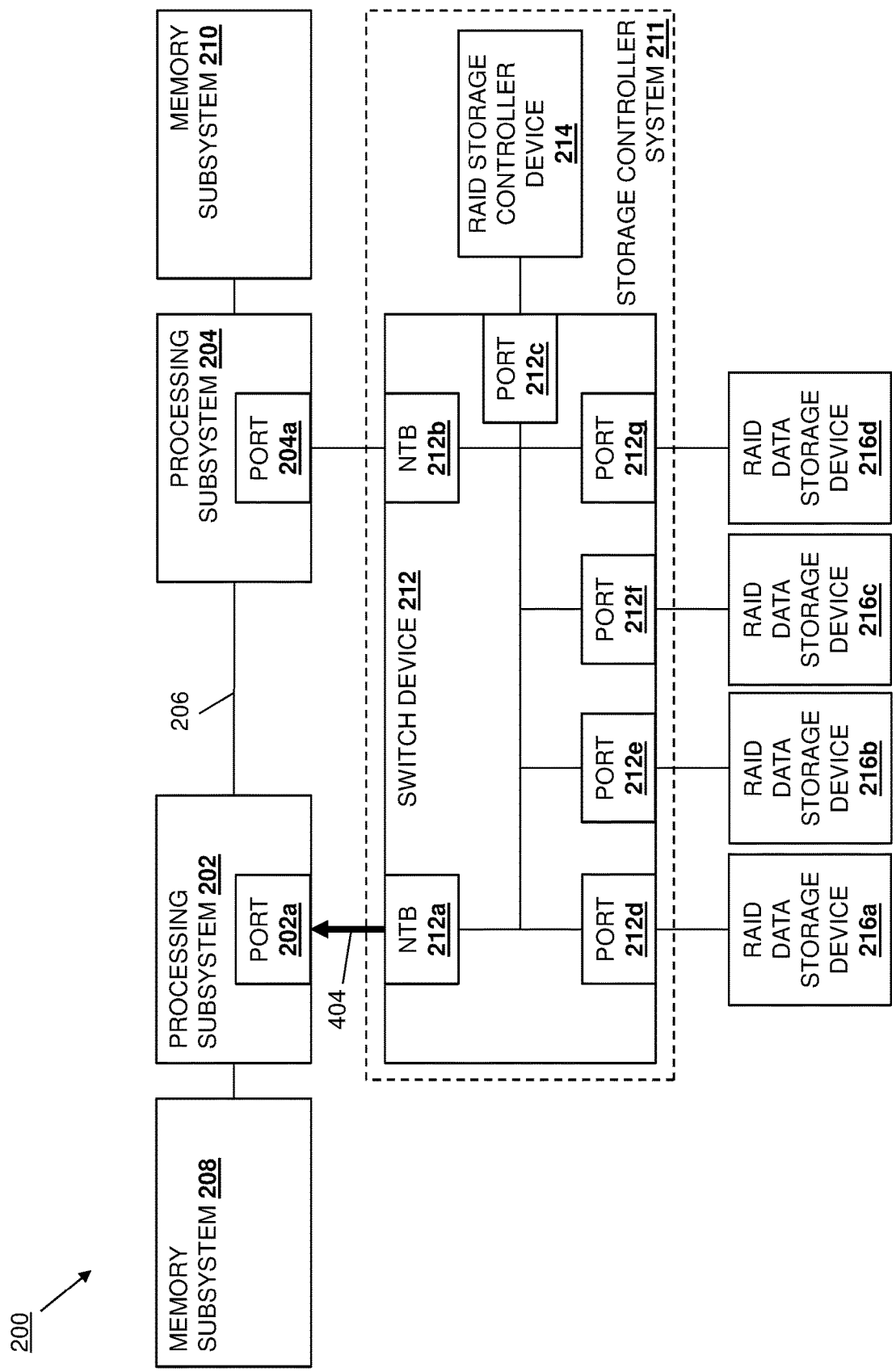
FIG. 4D is a schematic view illustrating an embodiment of the NUMA-aware storage system of FIG. 2 operating during the method of FIG. 3.

If, at decision block 308, a data transfer operation to a first memory subsystem is identified, the method 300 proceeds to block 310 where a first NTB subsystem claims the data transfer operation and provides it directly to the first memory subsystem. For example, in an embodiment of decision block 308 and in response to receiving the write command 400 at block 306, the RAID data storage device 216*a* may begin a Direct Memory Access (DMA) operation that includes transmitting a memory address identification communication 402 that identifies memory address(es) in the memory subsystem 208 that include the data that was identified in the write command 400, as illustrated in FIG. 4C. As discussed above, the NTB system 212*a* may be configured to claim memory addresses that are included in the memory subsystem 208 and identified as part of a DMA operation and, as such, at block 310 and in response to the switch device 212 receiving the memory address identification communication 402, the NTB system 212*a* may claim the DMA operation being performed by the RAID data storage device 216*a* and, in response, provide a DMA operation request communication 404 via the NTB subsystem 212*a* to the processing subsystem 202 that identifies those memory address(es), as illustrated in FIG. 4D.

Figure 4E:
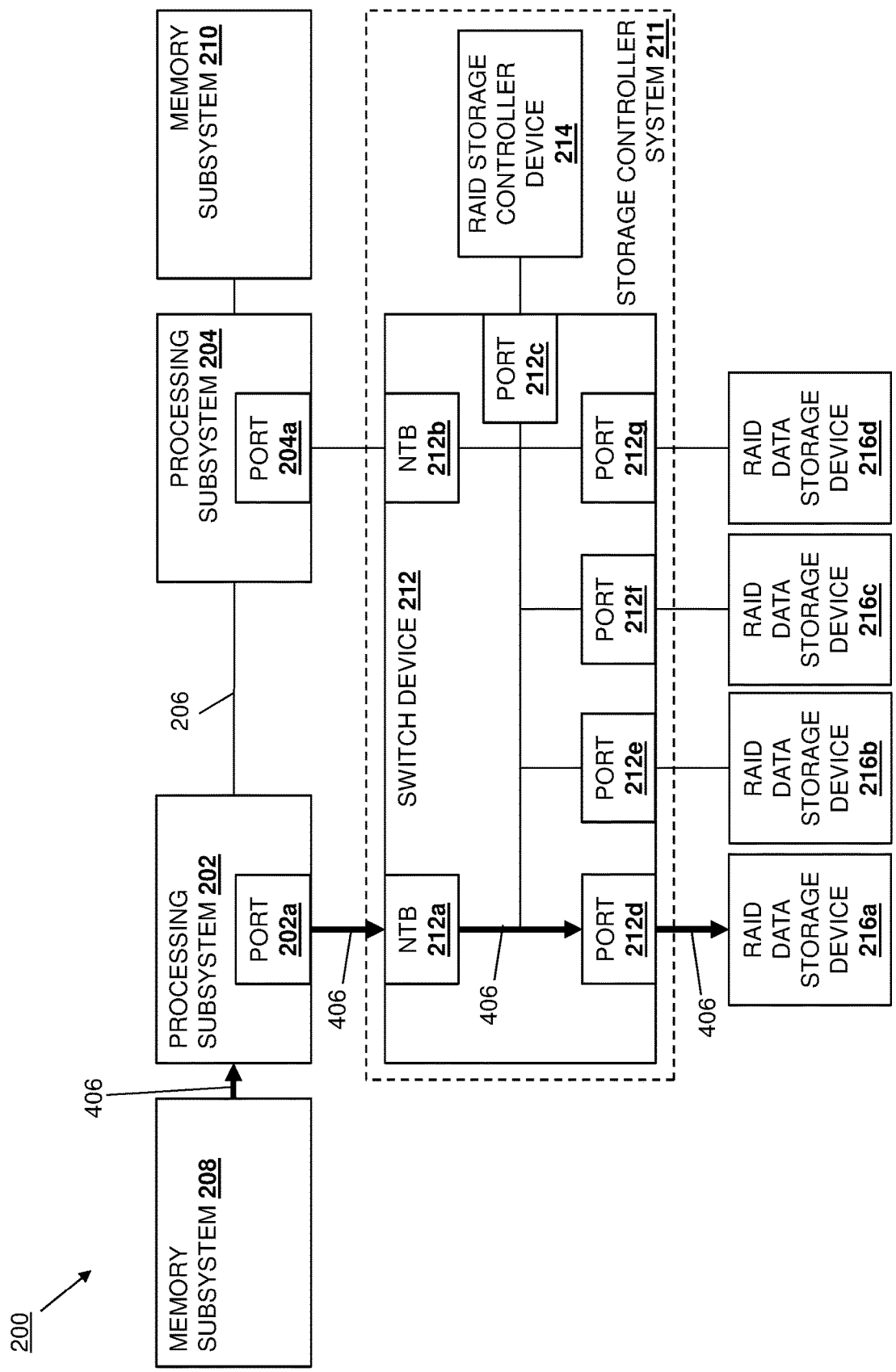
FIG. 4E is a schematic view illustrating an embodiment of the NUMA-aware storage system of FIG. 2 operating during the method of FIG. 3.
Figure 4F:
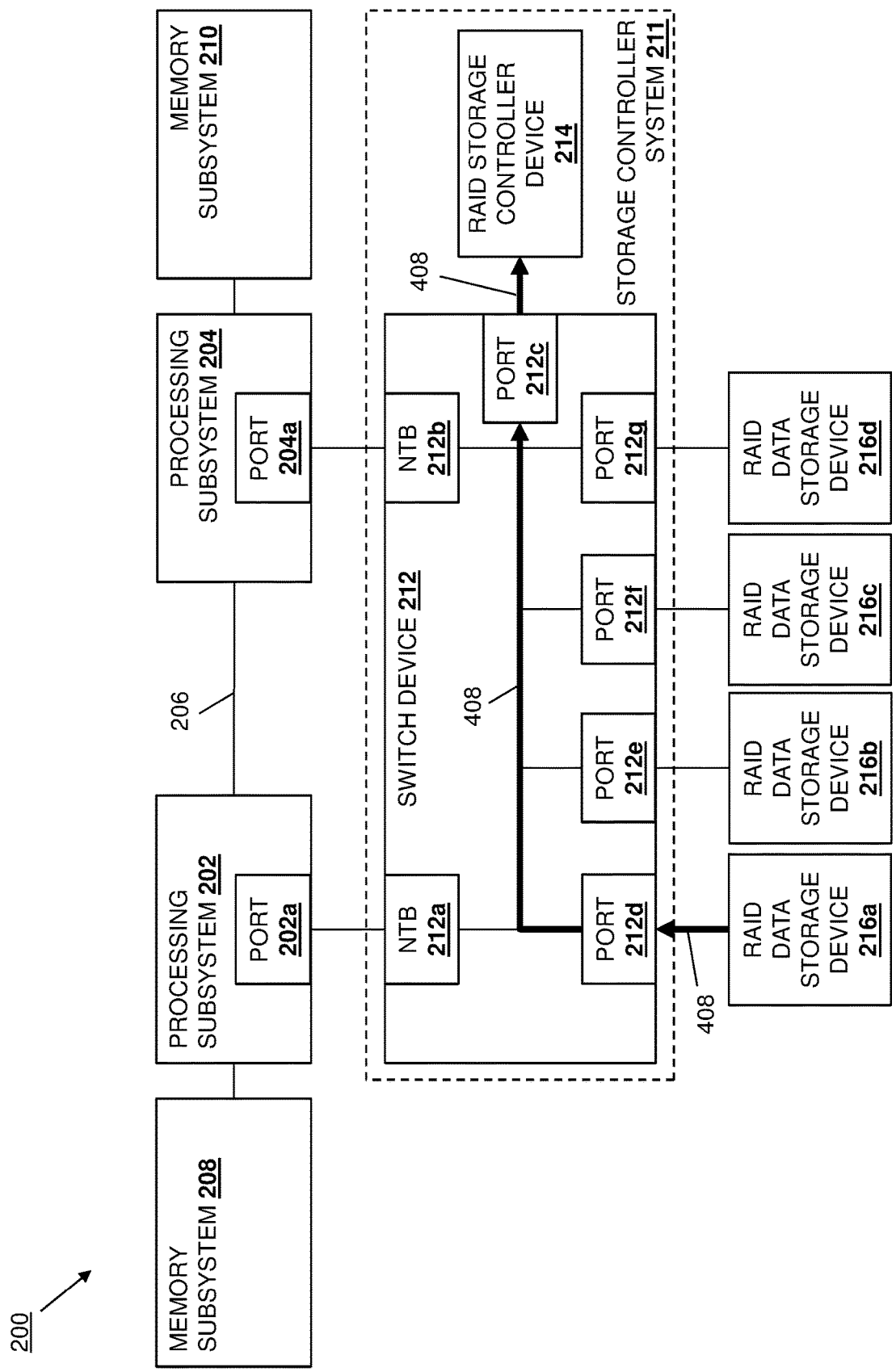
FIG. 4F is a schematic view illustrating an embodiment of the NUMA-aware storage system of FIG. 2 operating during the method of FIG. 3.
Figure 4G:
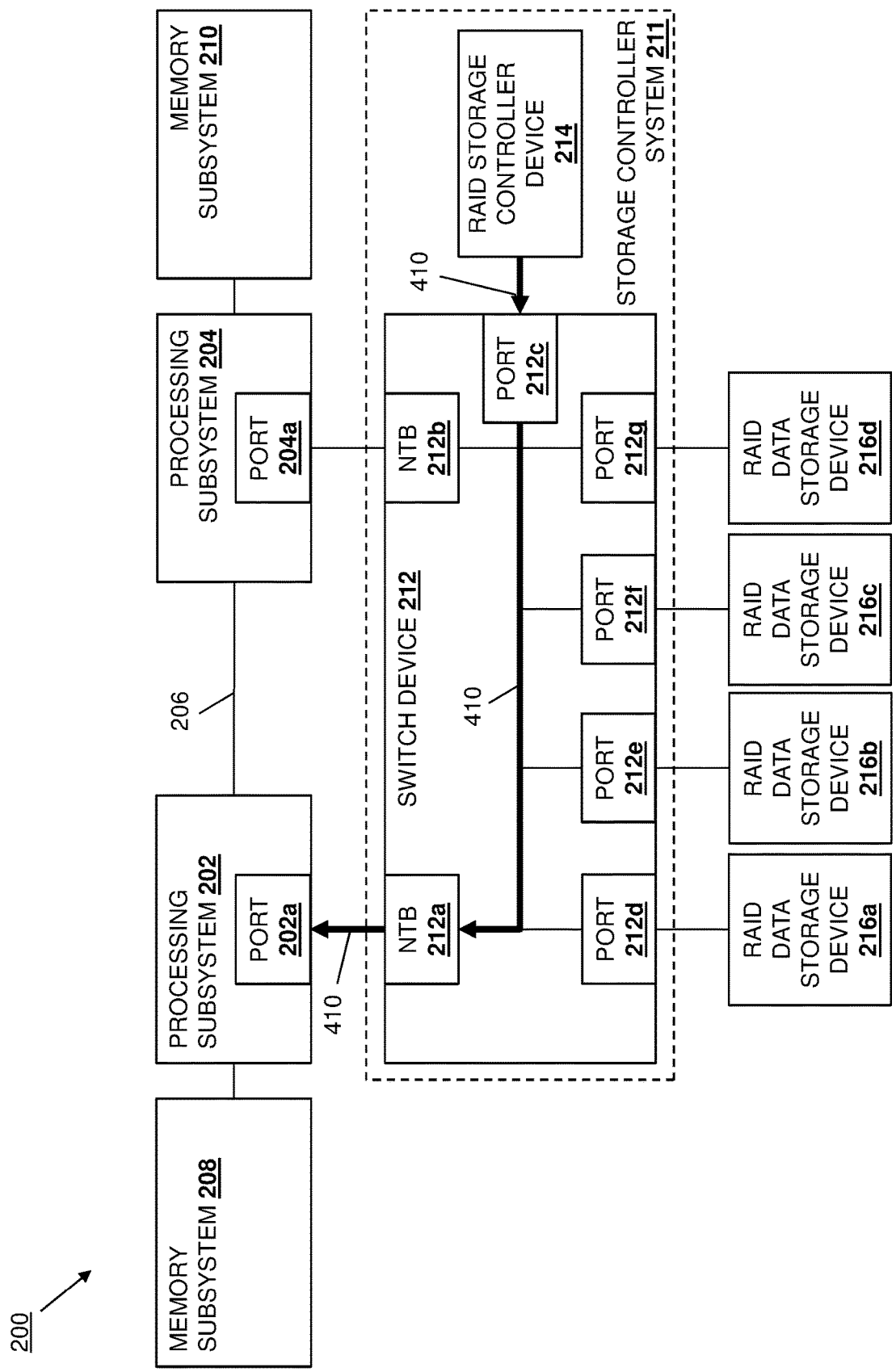
FIG. 4G is a schematic view illustrating an embodiment of the NUMA-aware storage system of FIG. 2 operating during the method of FIG. 3.

As illustrated in FIG. 4E, in response to receiving the DMA operation request communication 404 via its port 202*a*, the processing subsystem 202 may allow a DMA operation 406 that includes the RAID data storage device 216*a* retrieving the data from the memory address(es) in the memory subsystem 208 that was identified in the write command 400 directly from the memory subsystem 208 and via the processing subsystem 202 and the switch device 212. As will be appreciated by one of skill in the art in possession of the present disclosure, the NTB subsystem 212*a* claiming of the memory addresses(s) identified in the DMA operation 406 by the RAID data storage device 216*a* eliminates the possibility of the use of the processing subsystem interconnect 206 during those DMA operations 406 (e.g., which might occur if the memory address(es) in the DMA operation 406 were claimed by the NTB subsystem 212*b*, or if the DMA operation 406 was otherwise handled by the processing subsystem 204.) As illustrated in FIG. 4F, following the completion of the DMA operation 406, the RAID data storage device 216*a* may transmit a completion message 408 that acknowledges the completion of the write command 400 via the switch device 212 (e.g., via the port 212*d*) and to the RAID storage controller device 214 (e.g., via the port 212*c*.) As illustrated in FIG. 4G and in response to receiving the completion message 408, the RAID storage controller engine in the RAID storage controller device 214 may transmit a completion message 410 that acknowledges the completion of the write command 400 via the switch device 212 (e.g., via the port 212*c*) and to the processing subsystem 202 (e.g., via the NTB subsystem 212*a*), followed by an interrupt that causes the processing subsystem 202 to retrieve that completion message. However, while specific completion acknowledgement techniques are described above, one of skill in the art in possession of the present disclosure will recognize that other completion acknowledgement techniques (e.g., completion polling, etc.) will fall within the scope of the present disclosure as well.

Figure 5C:
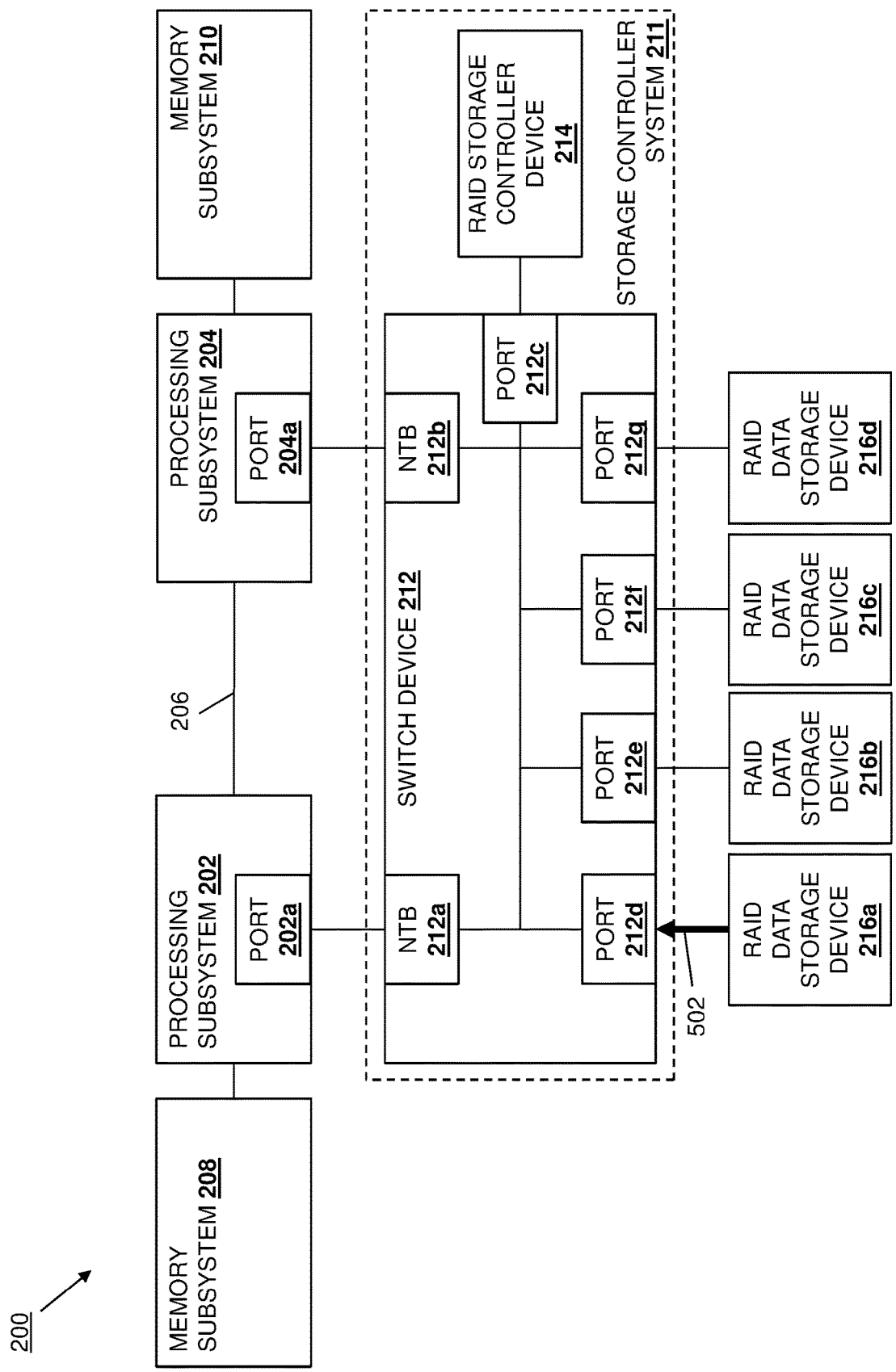
FIG. 5C is a schematic view illustrating an embodiment of the NUMA-aware storage system of FIG. 2 operating during the method of FIG. 3.
Figure 5D:
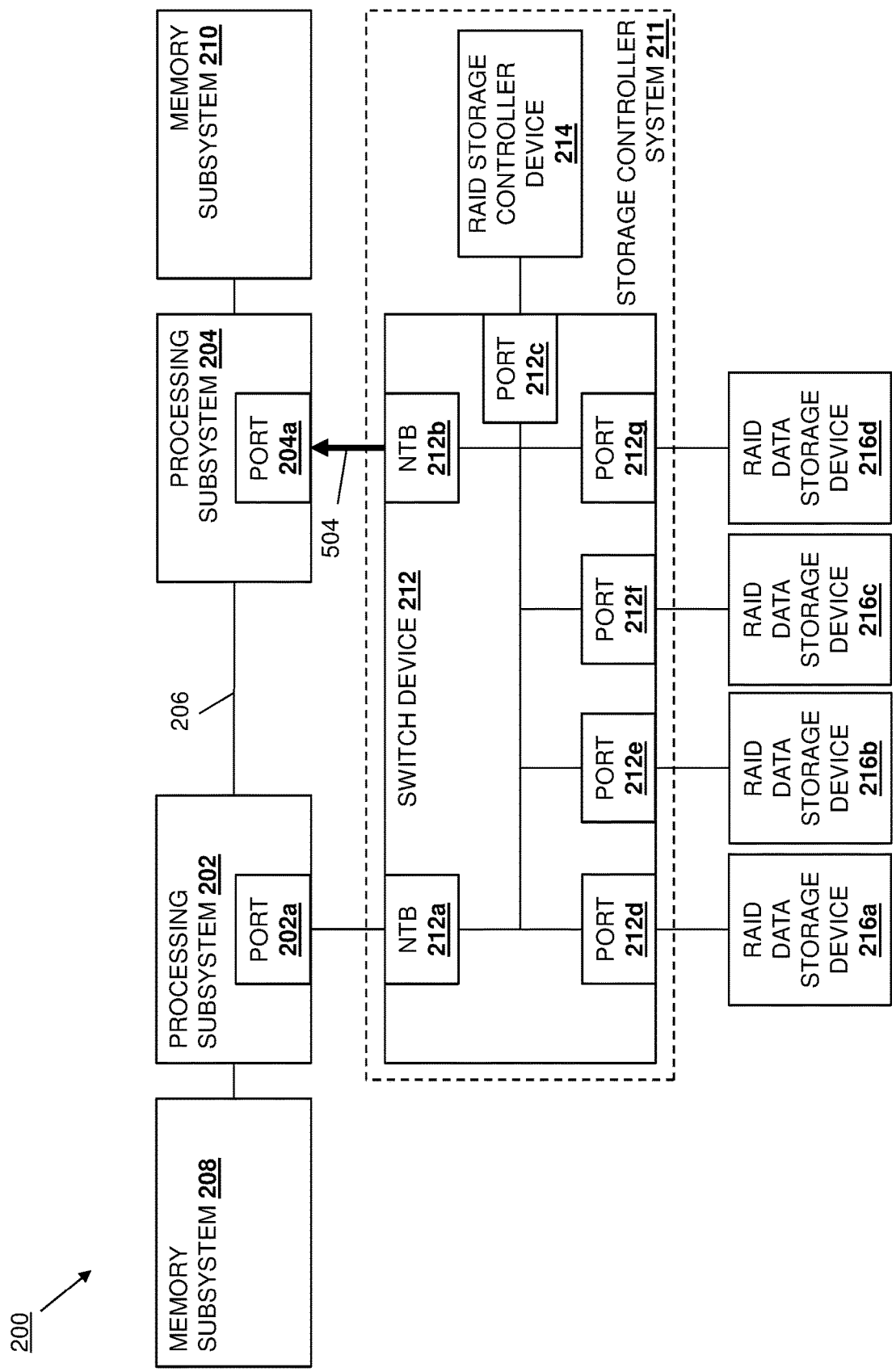
FIG. 5D is a schematic view illustrating an embodiment of the NUMA-aware storage system of FIG. 2 operating during the method of FIG. 3.

If at decision block 308, a data transfer operation to a second memory subsystem is identified, the method 300 proceeds to block 312 where a second NTB subsystem claims the data transfer operation and provides it directly to the second memory subsystem. For example, in an embodiment of decision block 308 and in response to receiving the write command 500 at block 306, the RAID data storage device 216*a* may begin a Direct Memory Access (DMA) operation that includes transmitting a memory address identification communication 502 that identifies memory address(es) in the memory subsystem 210 that include the data identified in the write command 500, as illustrated in FIG. 5C. As discussed above, the NTB system 212b may be configured to claim memory addresses that are included in the memory subsystem 210 and identified in a DMA operation and, as such, at block 310 and in response to the switch device 212 receiving the memory address identification communication 502, the NTB system 212b may claim the DMA operation being performed by the RAID data storage device 216a and, in response, provide a DMA operation request communication 504 via the NTB subsystem 212b to the processing subsystem 204 that identifies those memory address(es), as illustrated in FIG. 5D.

Figure 5E:
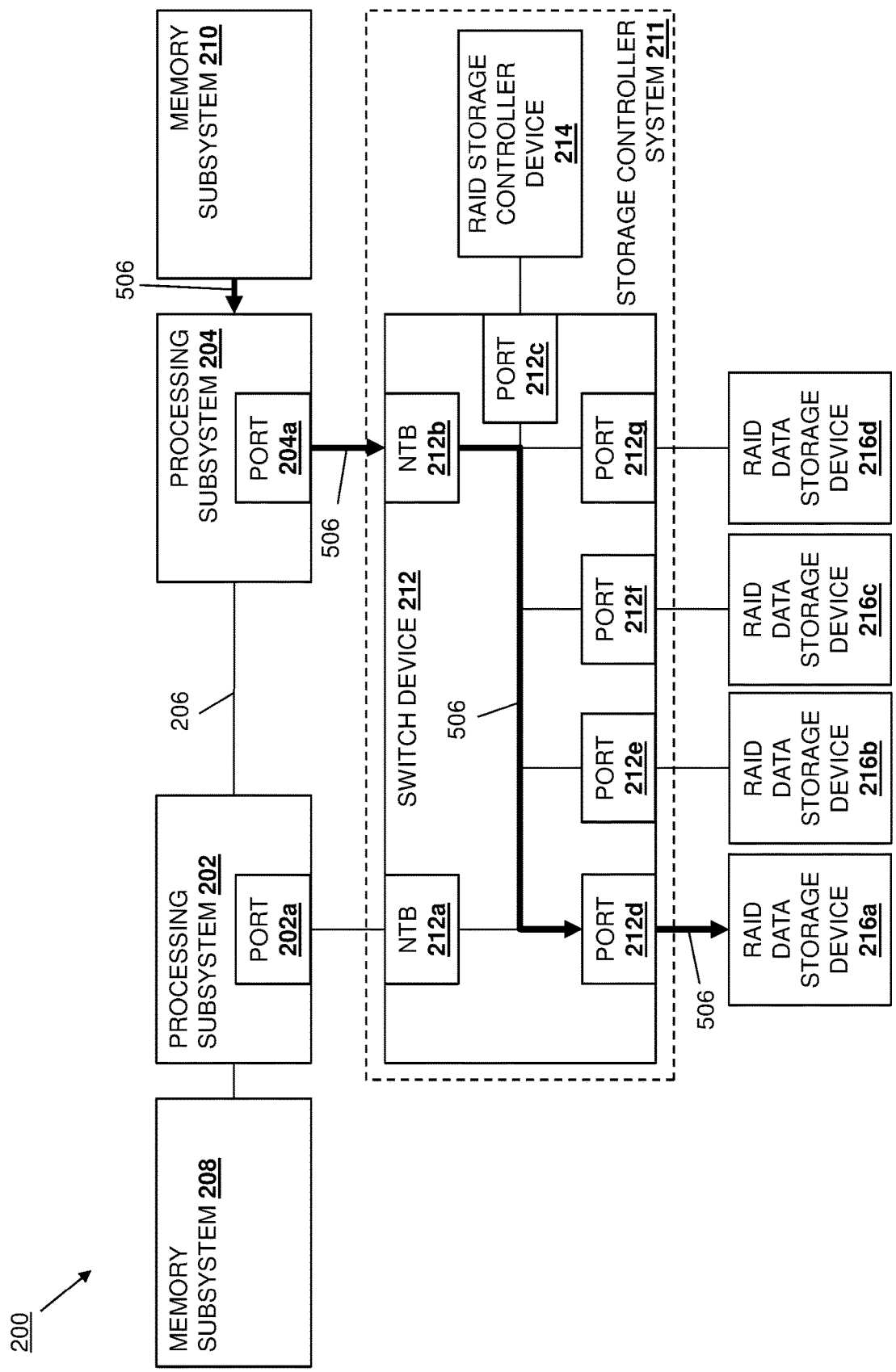
FIG. 5E is a schematic view illustrating an embodiment of the NUMA-aware storage system of FIG. 2 operating during the method of FIG. 3.
Figure 5F:
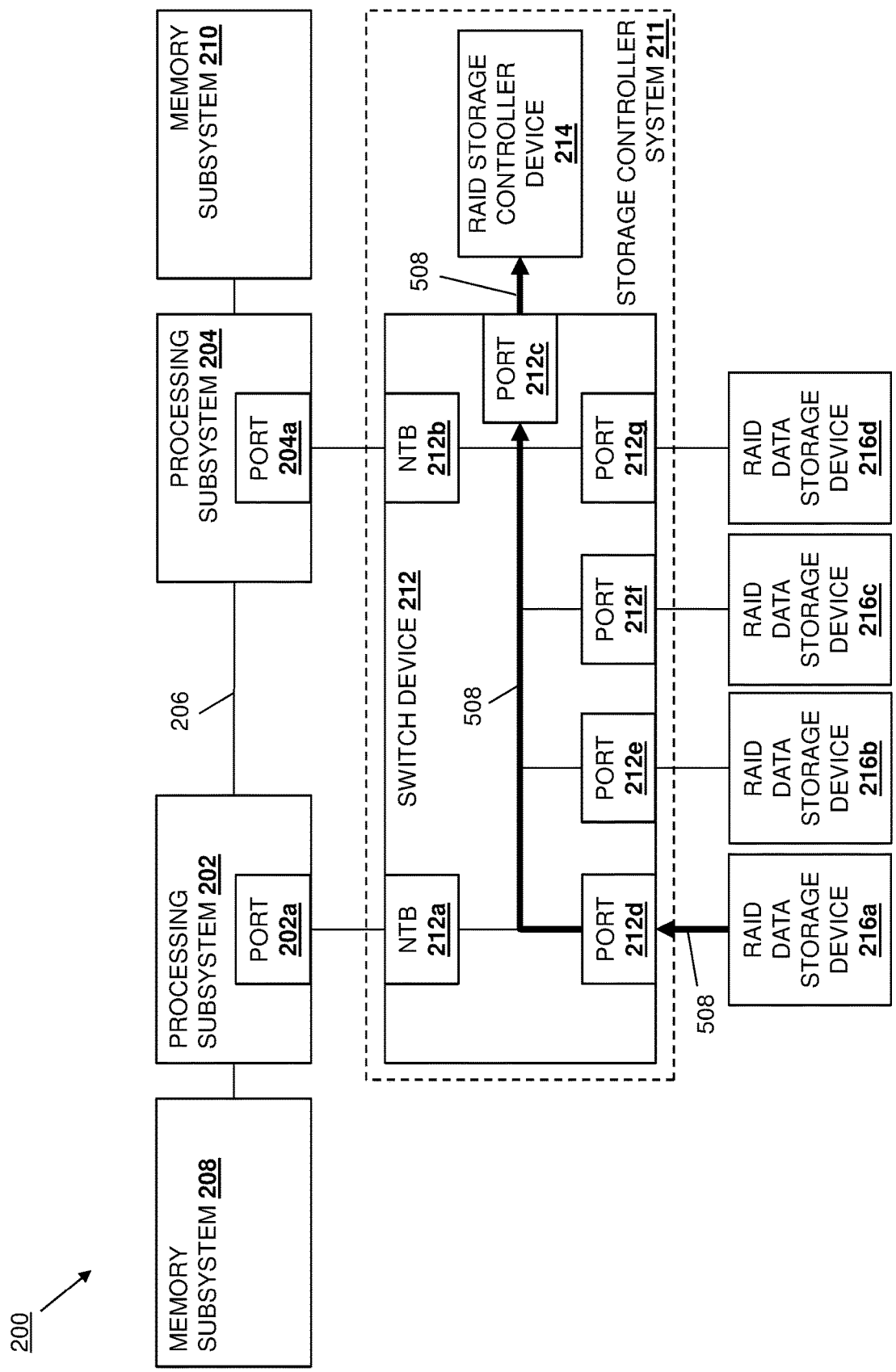
FIG. 5F is a schematic view illustrating an embodiment of the NUMA-aware storage system of FIG. 2 operating during the method of FIG. 3.
Figure 5G:
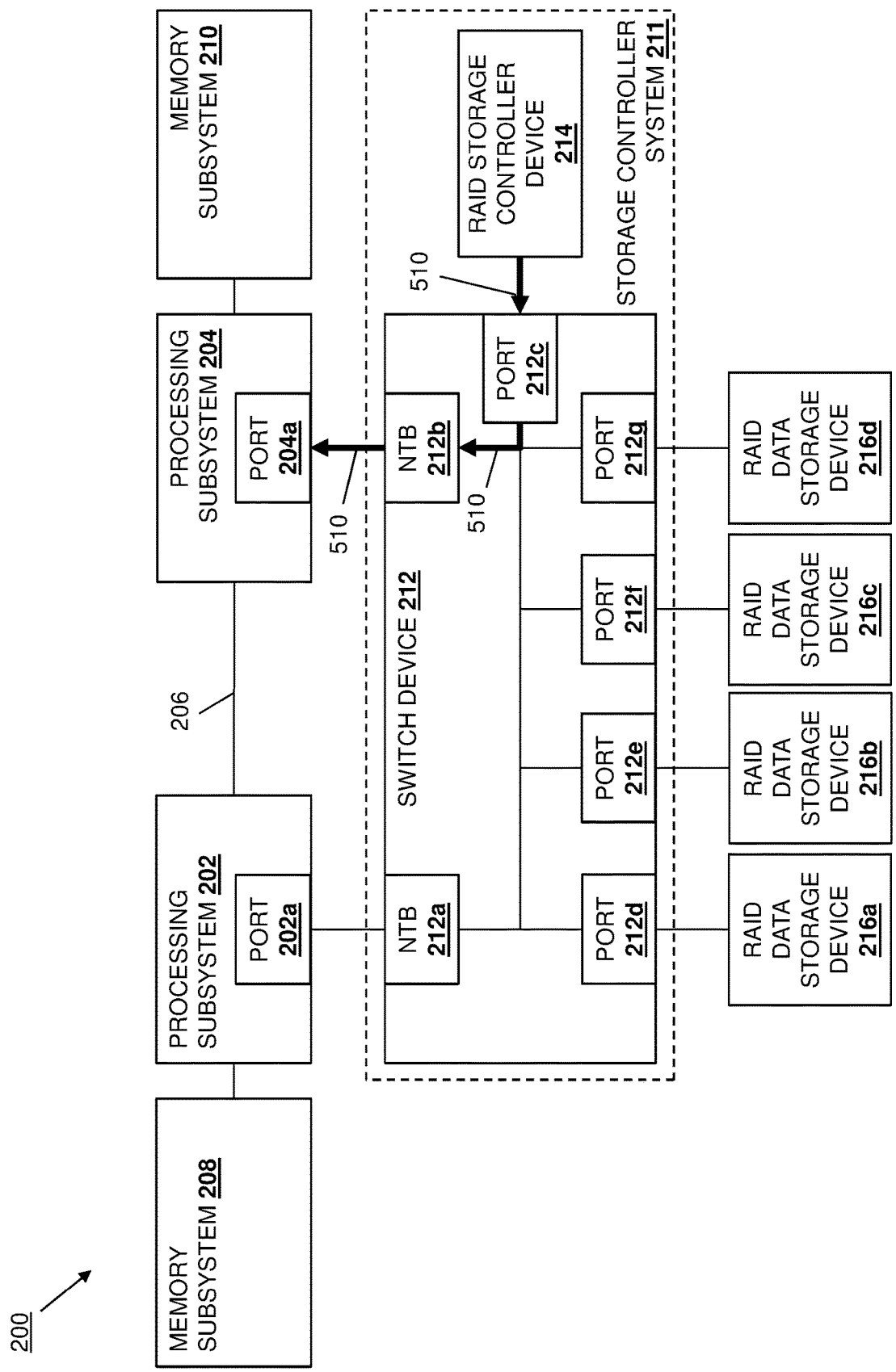
FIG. 5G is a schematic view illustrating an embodiment of the NUMA-aware storage system of FIG. 2 operating during the method of FIG. 3.

As illustrated in FIG. 5E, in response to receiving the DMA operation request communication 504 via its port 204a, the processing subsystem 204 may allow a DMA operation 506 that include the RAID data storage device 216a retrieving the data from the memory address(es) in the memory subsystem 210 that were identified in the write command 500 directly from the memory subsystem 210 and via the processing subsystem 204 and the switch device 212. As will be appreciated by one of skill in the art in possession of the present disclosure, the NTB subsystem 212b claiming of the memory addresses(s) utilized in the DMA operation 506 by the RAID data storage device 216a eliminates the possibility of the use of the processing subsystem interconnect 206 during those DMA operations 506 (e.g., which might occur if the memory address(es) in the DMA operation 506 were claimed by the NTB subsystem 212a, or if the DMA operation 506 was otherwise handled by the processing subsystem 202.) As illustrated in FIG. 5F, following the completion of the DMA operation 506, the RAID data storage device 216a may transmit a completion message 508 that acknowledges the completion of the write command 500 via the switch device 212 (e.g., via the port 212d) and to the RAID storage controller device 214 (e.g., via the port 212c.) As illustrated in FIG. 5G and in response to receiving the completion message 508, the RAID storage controller engine in the RAID storage controller device 214 may transmit a completion message 510 that acknowledges the completion of the write command 500 via the switch device 212 (e.g., via the port 212c) and to the processing subsystem 204 (e.g., via the NTB subsystem 212b), followed by an interrupt that causes the processing subsystem 202 to retrieve that completion message. However, while specific completion acknowledgement techniques are described above, one of skill in the art in possession of the present disclosure will recognize that other completion acknowledgement techniques (e.g., completion polling, etc.) will fall within the scope of the present disclosure as well.

Thus, systems and methods have been described that provide a storage controller system that includes a respective upstream port directly connected to each NUMA node, with each upstream port configured with a respective NTB subsystem that presents itself to the directly connected NUMA node as a storage device in a storage system. The storage controller system then spoofs a storage space provided by the storage system. When either of the NUMA nodes generates and transmits a data transfer command to the RAID storage controller system, the RAID storage controller system will receive that command and transmit it to the appropriate storage device in the storage system, and that storage device may perform a data transfer operation that identifies data stored in a memory subsystem included in one of the NUMA nodes. The NTB subsystems are configured to identify when a data transfer operation identifies data stored in a memory subsystem included in their directly connected NUMA node, and thus the one of the NTB subsystems will claim the data transfer operation performed by the storage device, and provide that data transfer operation directly to its directly connected NUMA node. As such, data transfer operations between the NUMA nodes and the storage devices in the storage system will not be transmitted over a processing subsystem interconnect between the processing subsystems in the NUMA nodes, thus allowing scaling of the computing device that includes the NUMA nodes (e.g., to provide additional processing subsystems), reducing the use of the processor interconnects to increase processing subsystem interconnect throughput and decrease latency associated with processing subsystem interconnect communications, and/or providing other benefits that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Non-Uniform Memory Access (NUMA)-aware storage system, comprising:
    a first processing subsystem coupled to a first memory subsystem;
    a second processing subsystem coupled to a second memory subsystem;
    a storage system; and
    a storage controller system that is coupled to the storage system and that includes:
        a first Non-Transparent Bridge (NTB) subsystem that is connected to the first processing subsystem and that is configured to:
            present the first NTB subsystem to the first processing subsystem as a first storage device; and
            identify first data transfer operations directed to the first memory subsystem and, in response, claim those first data transfer operations and provide them directly to the first processing subsystem;
        a second NTB subsystem that is connected to the second processing subsystem and that is configured to:
            present the second NTB subsystem to the second processing subsystem as a second storage device; and
            identify second data transfer operations directed to the second memory subsystem and, in response, claim those second data transfer operations and provide them directly to the second processing subsystem; and
        wherein the storage controller system is configured to:
            receive a command from either the first processing subsystem via the first NTB subsystem or the second processing subsystem via the second NTB subsystem and, in response, transmit that command to the storage system.

2. The system of claim 1, wherein the storage controller system includes:
    a switch device that includes the first NTB subsystem and the second NTB subsystem; and
    a storage controller device that is coupled to the switch device.

3. The system of claim 1, wherein the storage controller system is configured to:
spoof a namespace that identifies a storage space provided by the storage system to the first processing subsystem and the second processing subsystem.

4. The system of claim 1, wherein the storage system includes a plurality of Non-Volatile Memory Express (NVMe) storage devices, the first NTB subsystem is presented to the first processing subsystem as a first NVMe storage device, and the second NTB subsystem is presented to the second processing subsystem as a second NVMe storage device.

5. The system of claim 1, wherein the first processing subsystem is coupled to the second processing subsystem by processing subsystem interconnect, and wherein the first data transfer operations are provided directly to the first processing subsystem without using the processing subsystem interconnect, and the second data transfer operations are provided directly to the second processing subsystem without using the processing subsystem interconnect.

6. The system of claim 1, wherein the storage controller device is configured to:
program the first NTB subsystem to claim first memory addresses that are included in the first memory subsystem; and
program the second NTB subsystem to claim second memory addresses that are included in the second memory subsystem.

7. An Information Handling System (IHS), comprising:
a first Non-Transparent Bridge (NTB) subsystem that is connected to a first processing subsystem and that is configured to:
present the first NTB subsystem to the first processing subsystem as a first storage device; and
identify first data transfer operations directed to a first memory subsystem that is connected to the first processing subsystem and, in response, claim those first data transfer operations and provide them directly to the first processing subsystem;
a second NTB subsystem that is connected to a second processing subsystem and that is configured to:
present the second NTB subsystem to the second processing subsystem as a second storage device; and
identify second data transfer operations directed to a second memory subsystem that is connected to the second processing subsystem and, in response, claim those second data transfer operations and provide them directly to the second processing subsystem;
a controller processing system that is coupled to the first NTB subsystem and the second NTB subsystem; and
a controller memory system that is coupled to the controller processing system and that includes instructions that, when executed by the controller processing system, cause the controller processing system to provide a storage controller engine that is configured to:
receive a command from either the first processing subsystem via the first NTB subsystem or the second processing subsystem via the second NTB subsystem and, in response, transmit that command to a storage system.

8. The IHS of claim 7, further comprising:
a switch device that includes the first NTB subsystem and the second NTB subsystem; and
a storage controller device that is coupled to the switch device and that includes the controller processing system and the controller memory system.

9. The IHS of claim 7, wherein the storage controller engine is configured to:
spoof a namespace that identifies a storage space provided by the storage system to the first processing subsystem and the second processing subsystem.

10. The IHS of claim 7, wherein the storage system includes a plurality of Non-Volatile Memory Express (NVMe) storage devices, the first NTB subsystem is presented to the first processing subsystem as a first NVMe storage device, and the second NTB subsystem is presented to the second processing subsystem as a second NVMe storage device.

11. The IHS of claim 7, wherein the first processing subsystem is coupled to the second processing subsystem by processing subsystem interconnect, and wherein the first data transfer operations are provided directly to the first processing subsystem without using the processing subsystem interconnect, and the second data transfer operations are provided directly to the second processing subsystem without using the processing subsystem interconnect.

12. The IHS of claim 7, wherein the storage controller engine is configured to:
program the first NTB subsystem to claim first memory addresses that are included in the first memory subsystem; and
program the second NTB subsystem to claim second memory addresses that are included in the second memory subsystem.

13. The IHS of claim 7, wherein the storage subsystem is a Redundant Array of Independent Disks (RAID) storage subsystem including a plurality of RAID data storage devices.

14. A method for storing data in a Non-Uniform Memory Access (NUMA)-enabled computing device, comprising:
presenting, by a first Non-Transparent Bridge (NTB) subsystem, the first NTB subsystem to a first processing subsystem as a first storage device; and
identifying, by the first NTB subsystem, first data transfer operations directed to a first memory subsystem that is connected to the first processing subsystem and, in response, claiming those first data transfer operations and providing them directly to the first processing subsystem;
presenting, by a second NTB subsystem, the second NTB subsystem to a second processing subsystem as a second storage device; and
identifying, by the second NTB subsystem, second data transfer operations directed to a second memory subsystem that is connected to the second processing subsystem and, in response, claiming those second data transfer operations and providing them directly to the second processing subsystem;
receiving, by a storage controller engine, a command from either the first processing subsystem via the first NTB subsystem or the second processing subsystem via the second NTB subsystem and, in response, transmitting that command to a storage system.

15. The method of claim 14, wherein the first NTB subsystem and the second NTB subsystem are included in a switch device, and wherein the storage controller engine is included in a storage controller device that is coupled to the switch device.

16. The method of claim 14, further comprising:
spoofing, by the storage controller engine, a namespace that identifies a storage space provided by the storage system to the first processing subsystem and the second processing subsystem.

17. The method of claim 14, wherein the storage system includes a plurality of Non-Volatile Memory Express (NVMe) storage devices, the first NTB subsystem is presented to the first processing subsystem as a first NVMe storage device, and the second NTB subsystem is presented to the second processing subsystem as a second NVMe storage device.

18. The method of claim 14, wherein the first processing subsystem is coupled to the second processing subsystem by processing subsystem interconnect, and wherein the first data transfer operations are provided directly to the first processing subsystem without using the processing subsystem interconnect, and the second data transfer operations are provided directly to the second processing subsystem without using the processing subsystem interconnect.

19. The method of claim 14, further comprising:
programming, by the storage controller engine, the first NTB subsystem to claim first memory addresses that are included in the first memory subsystem; and
programming, by the storage controller engine, the second NTB subsystem to claim second memory addresses that are included in the second memory subsystem.

20. The method of claim 14, wherein the storage subsystem is a Redundant Array of Independent Disks (RAID) storage subsystem including a plurality of RAID data storage devices.

* * * * *

UNITED STATES PATENT AND TRADEMARK OFFICE
CERTIFICATE OF CORRECTION

| | |
|---|---|
| PATENT NO. | : 11,106,607 B1 |
| APPLICATION NO. | : 16/836341 |
| DATED | : August 31, 2021 |
| INVENTOR(S) | : Kotzur et al. |

It is certified that error appears in the above-identified patent and that said Letters Patent is hereby corrected as shown below:

In the Specification

Column 2, Line 8, "16/586,446" should be changed to --16/586,445--.

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*